United States Patent
Carter, Jr. et al.

(10) Patent No.: US 6,879,811 B1
(45) Date of Patent: Apr. 12, 2005

(54) SYSTEM AND METHOD FOR PROVIDING CELLULAR TELEPHONE SERVICE DURING CLUSTER TESTING

(75) Inventors: Charles E. Carter, Jr., Dacula, GA (US); Alan L. Johns, Stone Mountain, GA (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 477 days.

(21) Appl. No.: 10/029,798

(22) Filed: Dec. 31, 2001

(51) Int. Cl.[7] .............................................. H04B 17/00
(52) U.S. Cl. ..................... 455/67.11; 455/67.14; 455/433; 455/435.1; 455/35.2; 455/456.1; 455/445; 455/414.1; 455/518; 455/428
(58) Field of Search .......................... 455/67.11, 67.14, 455/435.1, 518, 414.2, 445, 428, 414.1, 435.2, 433, 456.1

(56) References Cited

U.S. PATENT DOCUMENTS

| | | | | |
|---|---|---|---|---|
| 6,070,070 A | * | 5/2000 | Ladue | 455/419 |
| 6,097,939 A | * | 8/2000 | Jacobs | 455/410 |
| 6,101,382 A | * | 8/2000 | Granberg | 455/414.1 |
| 6,141,544 A | * | 10/2000 | Corriveau et al. | 455/411 |
| 6,181,935 B1 | * | 1/2001 | Gossman et al. | 455/433 |
| 6,259,914 B1 | * | 7/2001 | Koster | 455/432.1 |
| 6,275,506 B1 | * | 8/2001 | Fazel et al. | 370/478 |
| 6,463,284 B2 | * | 10/2002 | Nakamura et al. | 455/433 |
| 6,594,490 B1 | * | 7/2003 | Ushiki et al. | 455/433 |
| 6,615,041 B2 | * | 9/2003 | Adamany et al. | 455/432.1 |
| 6,735,429 B1 | * | 5/2004 | Adamany et al. | 455/410 |

* cited by examiner

Primary Examiner—Marceau Milord
(74) Attorney, Agent, or Firm—Withers & Keys, LLC

(57) ABSTRACT

A cellular telephone system provides coverage during cluster testing in which a new mobile switching center (MSC) that is to replace an old MSC is cut into the cellular telephone system for testing. A trunk group is built between the old MSC and the MSC. In addition, a signaling link is built between the old MSC and the new MSC. The new MSC is also assigned a unique point code to differentiate the new MSC from the old MSC during testing. In addition, the new MSC is provided with a new range of temporary local dialing numbers (TLDNs) for use during cluster testing.

14 Claims, 6 Drawing Sheets

SYSTEM AND METHOD FOR PROVIDING CELLULAR TELEPHONE SERVICE DURING CLUSTER TESTING

BACKGROUND

1. Field of the Invention

The present invention relates generally to cellular telephone communication. More specifically, the present invention relates to maintaining cellular telephone service during cluster testing.

2. Background of the Invention

Cellular telephony enjoys widespread popularity. Its growth as a means of communication has been extraordinary. Indeed, today it is virtually impossible to go anywhere without using or seeing a cellular telephone. Such growth requires that the infrastructure supporting cellular telephony be upgraded in response to this growth. Many such upgrades directly affect mobile switching centers (MSCs), and require that an old MSC be replaced with a new MSC that has upgraded capabilities.

The MSC is a critical component of modern cellular networks. Functions performed by a typical MSC include telephone call routing and billing. There can be any number of MSCs in a particular cellular telephone network. One or more base stations is connected to each MSC in a cellular telephone network. Cellular telephones in a cellular telephone network communicate with an MSC through a base station.

When a cellular telephone is turned on or moves to an area covered by another MSC, the cellular telephone registers with the MSC whose coverage area it is in. Registration provides information to the cellular telephone system that is required for among other things, routing telephone calls to and from the cellular telephone. This information includes location information, such as the cellular telephone's identification and the point code of the MSC with which the cellular telephone registered.

The location information is stored in a home location register. During registration, the MSC sends a registration message to a home location register (HLR). The registration message contains the location information to be stored in the HLR. Consequently, after registration a query to the HLR can locate any active cellular telephones in a cellular telephone system.

In many systems, the HLR is centralized and accessible to entities that need to determine the location of a particular cellular telephone in a network. Use of a centralized HLR eliminates the need to maintain an HLR on each MSC in a cellular telephone network. In large cellular networks, this greatly reduces the cost of the system and facilitates implementation of fault tolerant features such as redundant HLRs.

When an old MSC is to be upgraded by replacement with a new MSC, the new MSC and the base stations that it will service must be tested. Testing of such cellular clusters is often referred to as "cluster" testing. When a new MSC is switched into operation in a network it is said to be "cut" into the network.

One significant problem with cutting a new MSC into a cellular network in conventional systems is that there was no new point code assigned to the new MSC. The intent was to assign the point code of the old MSC to the new MSC when the old MSC was retired. However, prior to the time when the new MSC is declared operational cellular telephones being serviced by base stations in the coverage area of the new MSC would not be able to be receive telephone calls. This is because the new MSC had the same point code as the old MSC. Prior to the new MSC being declared operational, the old MSC is still in the system. Consequently, when the system tried to locate a cellular telephone that had registered on the new switch, it would not know whether the point code referred to the old MSC or the new MSC.

To avoid this ambiguity, the new MSC was assigned a temporary point code (TPC). The TPC is a unique point code that uniquely identifies the new MSC. Once testing is complete, and the old MSC is removed from service, the TPC is replaced with the old MSC's point code.

Unfortunately, use of the TPC created a new set of problems. One problem was the fact that prior to the time the new MSC was placed into operation, there were no land line trunks to the new MSC. Voice trunks to the new MSC could not be accommodated because the local exchange carrier (LEC) was not aware of the TPC that had been assigned to the new MSC. Rather the land line switch, for example, a local exchange carrier (LEC), was in communication with the old MSC using the old MSC's point code. Consequently, there were no voice path trunks from the LEC to the new MSC. The lack of trunks to the LEC prevented a cellular telephone that had registered on the new MSC from making a telephone call to a land line telephone, as well as preventing a land line telephone from completing a telephone call to a cellular telephone registered on the new MSC.

SUMMARY OF THE INVENTION

The present invention solves the foregoing problems in the art by building a new trunk group between a new MSC and an old MSC it is replacing so that calls can be set up over the trunk group during cluster testing. In addition, a new signaling link is established between the new MSC and the STPs. Because the old MSC has connectivity to a land line switch, the new trunk group allows the old MSC to act as a tandem or relay switch for calls made by cellular telephones registered on the new MSC to land line telephones.

In addition to being assigned a temporary point code (TPC) as described above, the new MSC is provided with a new range of TLDNs to use to set up telephone calls made to cellular telephones registered on the new MSC. The telephone calls can be from land line telephones or cellular telephones registered on MSCs other than the new MSC. In addition, the old MSC is configured to set up calls having a TLDN in the new TLDN range over the new trunk group. Using the new TLDN range prevents calls from being dropped by the old MSC, which would otherwise not know about a cellular telephone registered on the new MSC.

In one embodiment, the present invention is a system for providing cellular telephone service during cluster testing. The system comprises a new MSC having a TPC. The system also includes an old MSC having a second point code. The second point code is different from the TPC. A trunk group is connected between the new MSC and the old MSC for routing telephone calls between the old MSC and the new MSC. The system also includes a communication link between the new MSC and the STPs to provide signaling required to set up telephone calls on the trunk. The system further includes an HLR that stores location information for cellular telephones that register with an MSC in the system. The HLR receives a registration message from the new MSC to register a cellular telephone with the new MSC.

In another embodiment, the present invention is a method for maintaining cellular service in a cellular telephone system during cluster testing. The method includes the step of assigning a TPC to a new MSC, which will replace an old MSC. The method also includes the step of cutting the new MSC into service in the cellular telephone network during cluster testing. The method includes the steps of building a trunk group between the old MSC and the new MSC, and of building a signaling link between the new MSC and the STPs. Calls are set up using the trunk group and signaling link between the new MSC and the STPs to maintain cellular service during cluster testing.

DETAILED DESCRIPTION OF THE INVENTION

Figure 1:
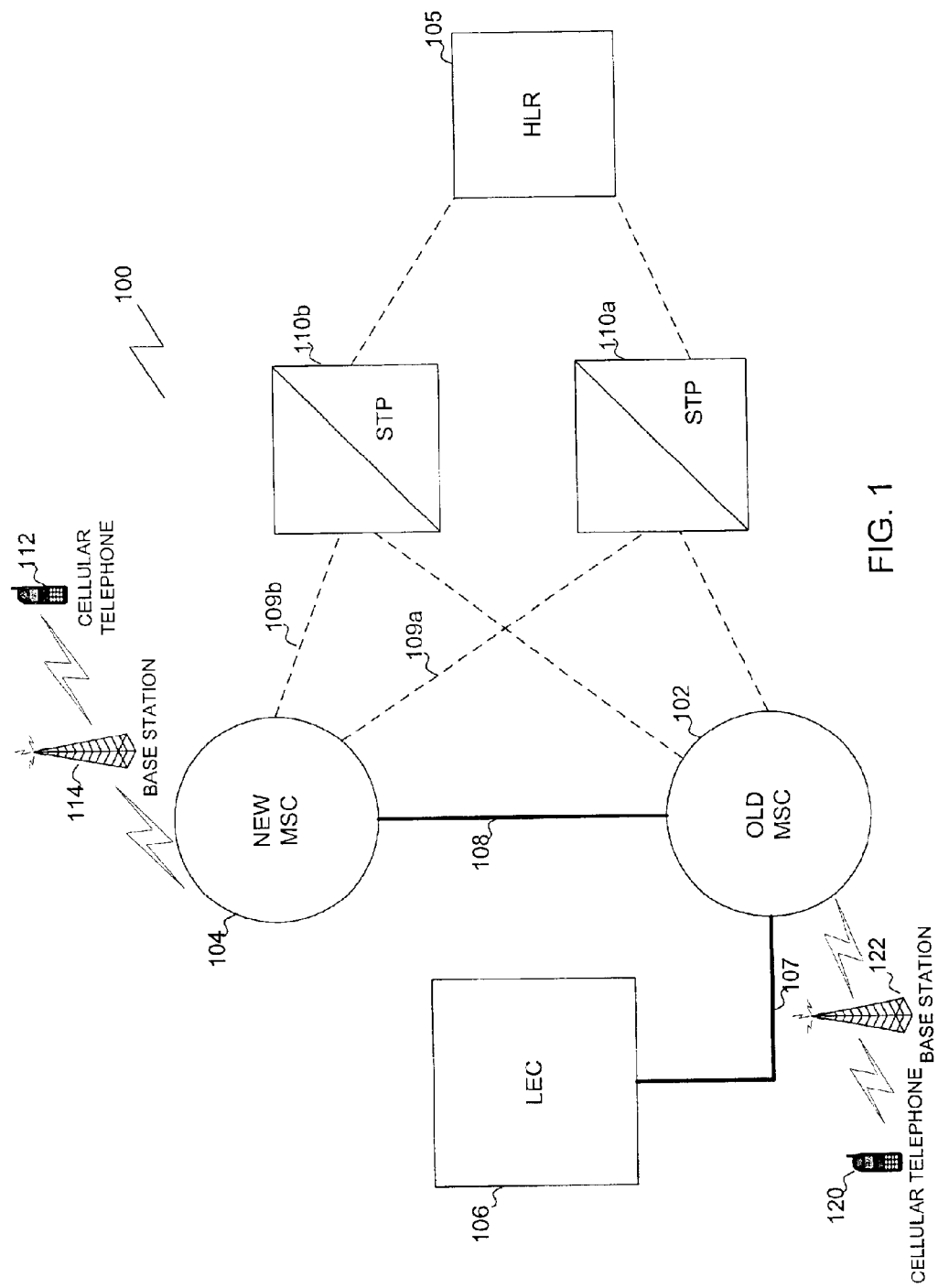
FIG. 1 is a schematic diagram of a system for providing cellular telephone service during cluster testing according to a first embodiment of the present invention.

FIG. 1 is a schematic diagram of a cellular telephone system 100 for providing continued service when converting from an old MSC 102 to a new MSC 104 according to an embodiment of the present invention. As used herein the term "cellular" applies to any wireless telephony, including cellular, mobile, and any other wireless telephony. Telephone system 100 is simplified to facilitate the present description of the invention. Old MSC 102 is in communication with a local exchange carrier (LEC) 106 over trunk group 107. LEC 106 can be one of the local telephone companies, for example, a Bell Operating Company (BOC) or an independent telephone company. Traditionally, LECs are responsible for providing local transmission and switching services. Trunk group 107 provides old MSC 102 with the ability to communicate with land line telephones.

Old MSC 102 is coupled to a home location register (HLR) 105. As described above, HLR 105 stores location information for each cellular telephone registered in telephone system 100. The location information includes an identification of the cellular telephone and the point code of the MSC on which the cellular telephone is registered.

To upgrade the system, old MSC 102 is replaced by new MSC 104. In anticipation of operation during cluster testing, new MSC 104 is assigned a temporary point code (TPC). The TPC eliminates the ambiguity that results if new MSC 104 is assigned the point code of the old MSC 102 prior to retirement of old MSC 102.

With this configuration, a cellular telephone registered on new MSC 104 can make and receive telephone calls to another cellular telephone registered on new MSC 104. However, a cellular telephone registered on new MSC 104 cannot complete telephone calls to or from land line telephone because there is no trunk group between LEC 106 and new MSC 104. Moreover, a cellular telephone registered on new MSC 104 is not be able to receive a telephone calls from a cellular telephones registered on MSCs other than new MSC 104.

To enable communication with LEC 106 to allow telephone calls between land line telephones and cellular telephones registered on new MSC 104, a trunk group 108 is built between new MSC 104 and old MSC 102. In addition, to provide the necessary signaling path, signaling links 109a and 109b are added between new MSC 104 and STPs 110a and 110b. These modifications enable old MSC 102 to act as a tandem switch for new MSC 104 to LEC 106. That is, with trunk group 108 and signaling links 109a and 109b, telephone calls can be routed between LEC 106 and new MSC 104 through old MSC 102, which has the required connectivity to LEC 106.

New MSC 104 is also configured to send telephone calls having land line NPA-NXXs over trunk group 108 to old MSC 102. Any requisite signaling for setting up such telephone calls through old MSC 102 is performed on signaling links 109a and 109b. In addition old MSC 102 is configured to accept such telephone calls and transfer them over trunk group 107 to LEC 106. Thus, when a cellular telephone registered on new MSC 104 calls a land line telephone, new MSC 104 completes the telephone call through old MSC 102 over trunks group 108.

Any signaling required to reserve a trunk in trunk group 108 to set the telephone call up is performed on signaling links 109a and 109b. When the trunk is reserved, the call is established from new MSC 104 to LEC 106 through old MSC 102 over a trunk in trunk group 108 and a trunk in trunk group 107.

For example, assume a cellular telephone 112 enters the cluster testing area, i.e., the coverage area serviced by new MSC 104. In this case, cellular telephone 112 enters this coverage area by entering the coverage area of base station 114. Base station 114 is controlled by new MSC 104. When cellular telephone 112 enters the coverage area of new MSC 104, it registers with new MSC 104. During the registration process, cellular telephone 112 sends a registration request to new MSC 104 through cell site 114. In response to the registration request, new switch MSC 104 sends a registration message to HLR 105. The registration message includes an identification of cellular telephone 112 and the point code associated with new MSC 104. HLR 105 stores the identification and point code. At this point, cellular telephone 112 is registered with cellular telephone system 100.

When cellular telephone 112 makes a telephone call to a land line telephone, base station 114 sends a message to new MSC 104. The message includes the called party number. New MSC 104 analyzes the NPA-NXX associated with the called party number to determine whether it has a trunk group or route to connect to that NPA-NXX. Due to the configuration of new MSC 104 to route telephone calls having land line NPA-NXXs over trunk group 108, new MSC 102 determines that it does have such a trunk group, that trunk group being trunk group 108. In conventional systems where trunk group 108 is not present, the telephone call is dropped because new MSC 104 does not have connectivity to LEC 106.

To enable the required call paths, an initial address message (IAM) is sent from new MSC 104 to old MSC 102 over signaling links 109a and 109b to reserve a trunk in trunk group 108 for the telephone call. Old switch 102 analyzes the NPA-NXX of the called party number in the IAM message. Old MSC 102 determines that the NPA-NXX of the dialed number corresponds to a land line telephone number. Consequently, old MSC 102 sends an IAM message to LEC 106 to reserve a trunk in trunk group 107 for the telephone call.

In response, LEC 106 sends old MSC 102 an address complete message (ACM) indicating that a trunk in trunk group 107 has been reserved for the telephone call. Old MSC 102 sends an ACM message to new MSC 104 over signaling links 109a and 109b to indicate a trunk in trunk group 108 has been reserved for the telephone call. LEC 106 also rings the land line telephone corresponding to the called party number. Thus, the present invention enables the establishment of a voice path over trunk groups 107 and 108 to complete a telephone call from cellular telephone 112 to a land line telephone.

The addition of trunk group 108 and signaling links 109a and 109b also solved another problem. The problem arose when a cellular telephone registered on new MSC 104 attempted to call a cellular telephone registered on old MSC 102. Without trunks 108 and signaling links 109a and 109b, there was no connectivity between old MSC 102 and new MSC 104 and the telephone call is dropped. The addition of trunk group 108 and signaling links 109a and 109b eliminated this cause of dropped calls.

For example, when cellular telephone 112 places a telephone call to a cellular telephone 120 that is registered on old MSC 102, new MSC 104 sends a location request to HLR 105 to determine the location of cellular telephone 120. HLR 105 uses called-party information included in the location request message to identify the point code of the MSC of the called cellular telephone. In the present example, HLR 105 sends a routing request to old MSC 102 to obtain a TLDN with which to route the call. Old MSC 102 forwards the TLDN obtained from HLR 105 to new MSC 104. New MSC 104 recognizes the TLDN as a TLDN associated with old MSC 102. New MSC 104 is configured so that telephone calls having TLDNs corresponding to TLDNs in old MSC 102 are routed over new trunk group 108. When old MSC 102 receives the call, it analyzes the TLDN. Old MSC 102 recognizes the TLDN as one of its own, and obtains information from its VLR that it uses to page cellular telephone 120 to complete the telephone call.

Figure 2:
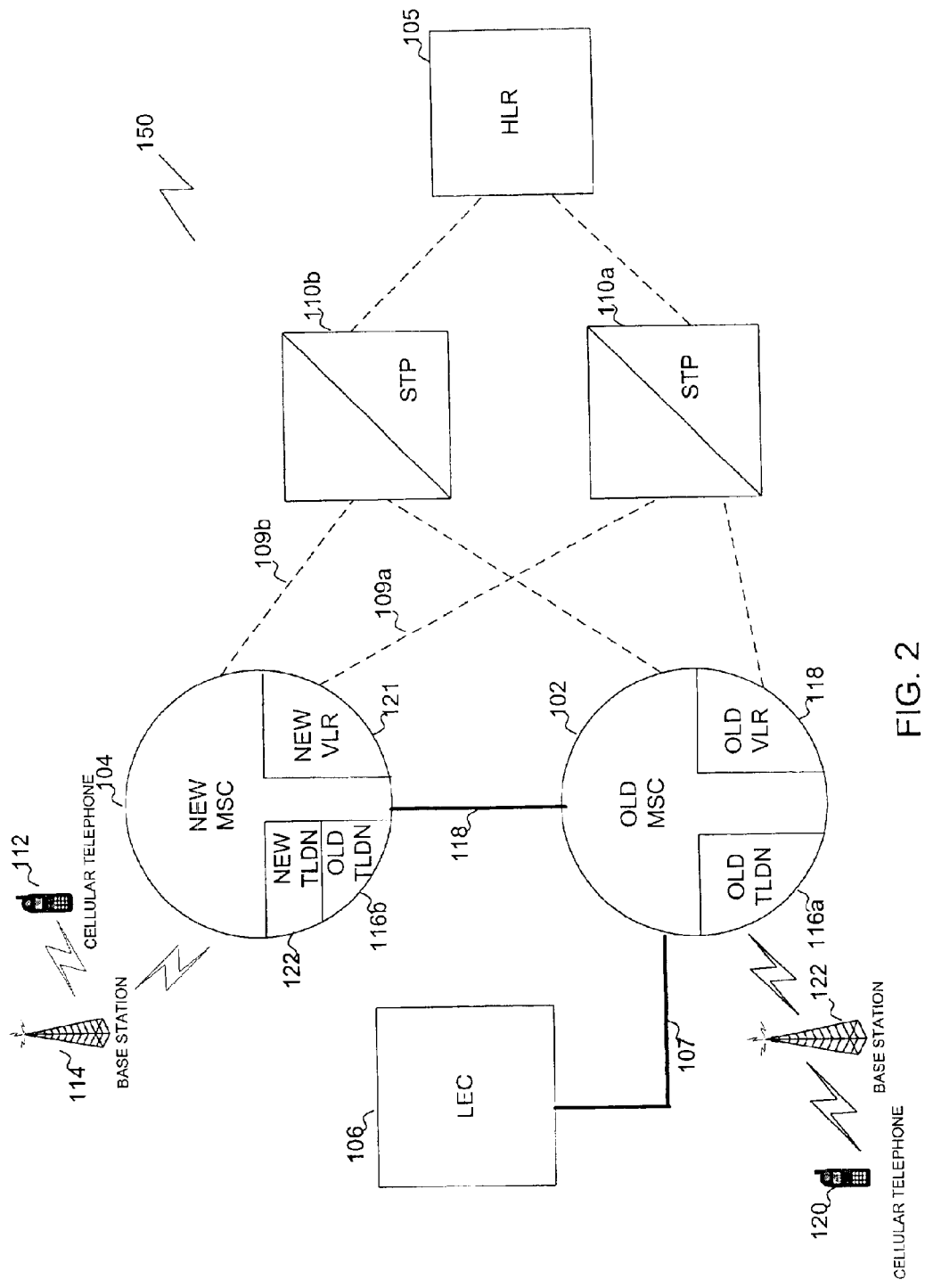
FIG. 2 is a schematic diagram of a system for providing cellular telephone service during cluster testing according to a second embodiment of the present invention.

It was explained above that new MSC 104 is configured to route telephone calls having TLDNs corresponding to TLDNs in old MSC 102. This is because initially, new MSC 104 has the same TLDNs as old MSC 102. The reason is that new MSC 104 is intended to be essentially a replica of old MSC 102. As shown in cellular telephone system 150 shown schematically in FIG. 2, new MSC 104 has a range of TLDNs 116b that are essentially a copy of the range of TLDNs 116a assigned to old MSC 102. However, as explained below, this leads to problems when a cellular telephone registered on another MSC tries to make a telephone call to a cellular telephone registered on new MSC 104. For example, assume a telephone call is made to cellular telephone 112 from a cellular telephone 120. Cellular telephone 112 is registered on new MSC 104. Cellular telephone 120 is registered on old MSC 102, but could be registered on any MSC other than new MSC 104 for purposes of the present example.

When cellular telephone 120 calls cellular telephone 112, old MSC 102 sends a location request to HLR 105 seeking a TLDN with which it can complete the telephone call. HLR 105 analyzes the NPA-NXX associated with the called party number to determine the point code of the MSC on which the called party number is registered. In this case, HLR 105 determines that the point code is the TPC that has been assigned to new MSC 104. Thus, HLR 105 sends a route request message to new MSC 104. In conventional systems, new MSC 104 provides a TLDN from old TLDN range 116b in response to the route request from HLR 105. HLR 105 transfers this TLDN to old MSC 102 in response to the location request message. When old MSC 102 analyzes the TLDN it received, it determines that it is one of its own TLDNs. Consequently, it attempts to find information for routing the telephone call in its VLR, old VLR 118. However, because cellular telephone 112 is registered with new MSC 104, this location information is in new VLR 121, not in old VLR 118. Consequently, old MSC 102 does not find the information it requires to route the telephone call. As a result, old MSC 102 drops the call.

An analogous situation occurs when a land line call is made to cellular telephone 112. The MSC to which the LEC handling the land line call is connected behaves in an analogous manner to MSC 102. For example, if the land line is associated with LEC 106, LEC 106 analyzes the NPA-NXX and communicates with old MSC 102 to complete the call. When the call setup is attempted in the cellular system, old MSC 102 will drop the call as described above.

To solve this problem, a new range of TLDNs 122 is created for new MSC 104. In addition, old MSC 102 is configured to route a call over trunk group 108 when it receives a TLDN in new TLDN range 122. Thus, the call flow of a telephone call made to cellular telephone 112 using the present invention is as follows.

When cellular telephone 120 makes a telephone call to cellular telephone 112, old MSC 102 sends a location request to HLR 105 seeking a TLDN with which it can complete the telephone call. HLR 105 analyzes the NPA-NXX associated with the called party number to determine the point code of the MSC on which the called party number is registered. In this case, HLR 105 determines that the point code is the TPC of new MSC 104. Thus, HLR 105 sends a route request message to new MSC 104. New MSC 104 analyzes the called party number in the route request, and determines that the called party is cellular telephone 112. New MSC 104 recognizes that cellular telephone 112 is registered on it by looking in new VLR 121. According to an embodiment of the present invention, new MSC 104 then returns a TLDN from new TLDN range 122 in response to the route request from HLR 105. HLR 105 transfers this TLDN to old MSC 102 in response to the location request message.

When old MSC 102 analyzes the TLDN it received, it determines that the TLDN is a TLDN from new TLDN range 122. Because it has been reconfigured according to the present invention, old MSC 102 routes the telephone call over a trunk in new trunk group 108 using messaging sent over signaling links 109a and 109b. In effect, old MSC 102 then treats the new TLDN range as a "rollover" and routes the telephone call back to new MSC 104 so that it can be completed. When new MSC 104 receives the call messaging having one of the new TLDNs, it recognizes the TLDN and completes the telephone call by paging cellular telephone 112 to ring cellular telephone 112.

An analogous situation occurs when a land line call is made to cellular telephone 112. The MSC to which the LEC handling the land line call is connected behaves in an analogous manner to MSC 102. For example, if the land line is associated with LEC 106. LEC 106 analyses the NPA-NXX and communicates with old MSC 102 to complete the call. When the call setup is attempted in the cellular system, old MSC 102 will complete the call as described above.

Implementation of the present invention can be facilitated using global title translation (GTT) techniques. GTT tables contain point codes corresponding to particular NPA-NXXs. In the present invention, GTT tables are located in a centralized location in the cellular telephone network. For example, in an embodiment of the present invention, the GGT tables are located in STPs 110a and 110b. Preferably, STP 110b is a redundant version of STP 110b. Groups of NPA-NXXs owned by each MSC in the network are configured to point to the centralized locations STP 110a and STP 110b. When a cellular telephone registers with an MSC, its point code is assigned to STP 110a. Should STP 110a fail, STP 110b is used as a backup.

The present invention can be implemented in a system having a non-redundant STP, and non-redundant communication links 109a and 109b. For example, the present invention can be implemented in a system having a non-redundant STP 110a and a non-redundant communication link 109a.

Call processing and call flow proceed as described above with one important exception. The exception is that now the STP does a global title translation to determine where the appropriate HLR is to respond to a location request. For example, NPA-NXXs in STPs 110a and 110b are configured to associate HLR 105's point code with NPA-NXXs stored in those STPs.

In the embodiment disclosed above, a centralized HLR 105 is employed. The centralized HLR 105 eliminates the need to have an HLR in each MSC that has to be maintained independently. As a result, the VLR in each MSC stores location information for cellular telephones homed on the MSC as well as those that are visiting the MSC. It would be apparent to those skilled in the art how to apply the invention disclosed herein to a cellular system in which an HLR is configured for each MSC.

Figure 3:
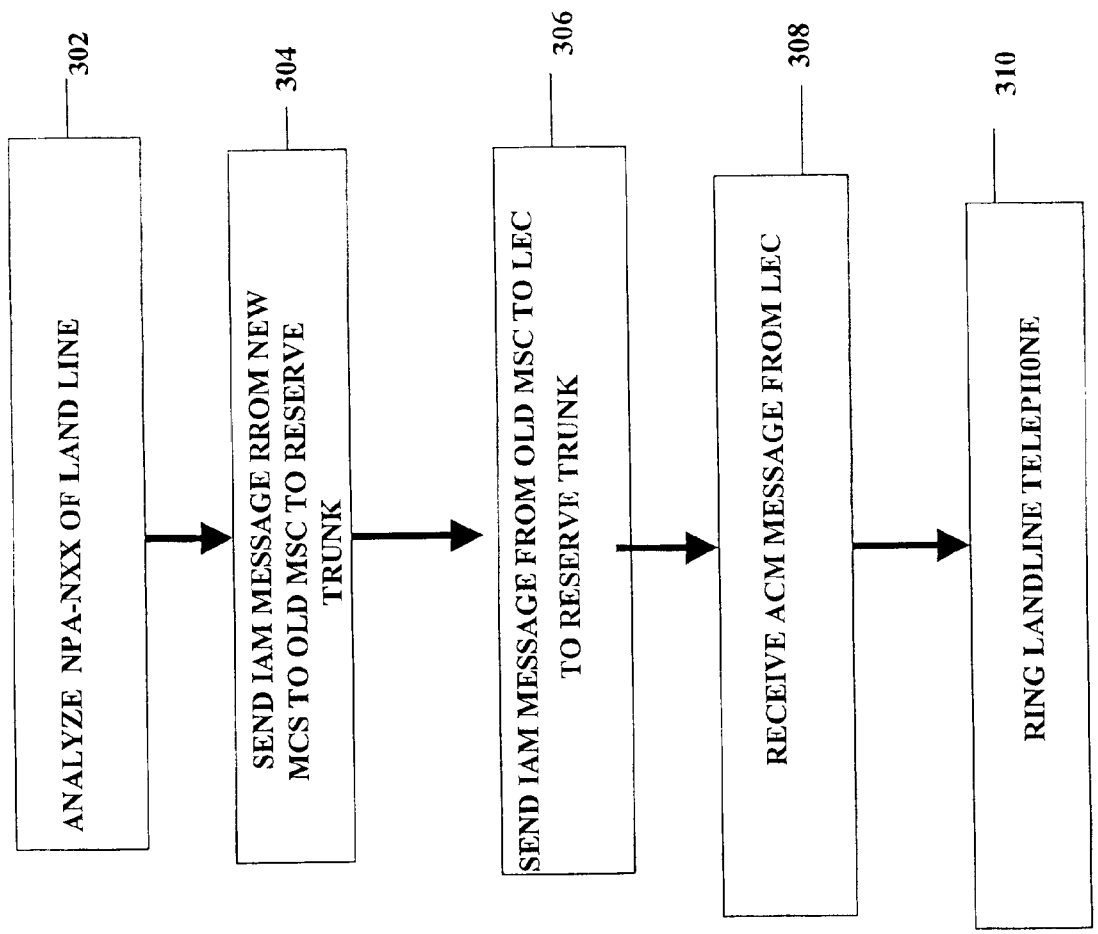
FIG. 3 is a flowchart for a method for calling a land line telephone from a cellular telephone registered on a new MSC during cluster testing according to an embodiment of the present invention.

FIG. 3 is a flowchart for a method for calling a land line telephone from a cellular telephone 112 registered on new MSC 104 during cluster testing according to an embodiment of the present invention. Cellular telephone 112 is registered with a new MSC that is undergoing cluster testing. As described above, as part of this registration process, a registration message is sent to an HLR to provide location information for responding to location requests from other MSCs in the cellular system.

A method for calling a land line telephone from a cellular telephone registered on new MSC 104 is as follows. When a cellular telephone registered on a new MSC attempts a telephone call to a telephone on a land line telephone system, the method includes step 302 of analyzing the NPA-NXX of the called party. In this case, the NPA-NXX indicates that the called party is land line telephone. The method includes step 304 of sending an IAM message from the new MSC to an old MSC that is connected to a LEC. The IAM message is a request to reserve a trunk for the telephone call between the old MSC and the new MSC, using a new trunk group that is built between the old MSC and the new MSC. The method continues in step 306, by sending an IAM message to the LEC coupled with the land line telephone to reserve a trunk between the old MSC and the LEC. The old MSC is connected to a LEC. The method continues in step 308 by generating an ACM message to return to the old MSC and the new MSC in response to the IAM message. The ACM message indicates a trunk has been reserved between the LEC, the old MSC and the new MSC. The method continues in step 310 by ringing the land line telephone.

Figure 4:
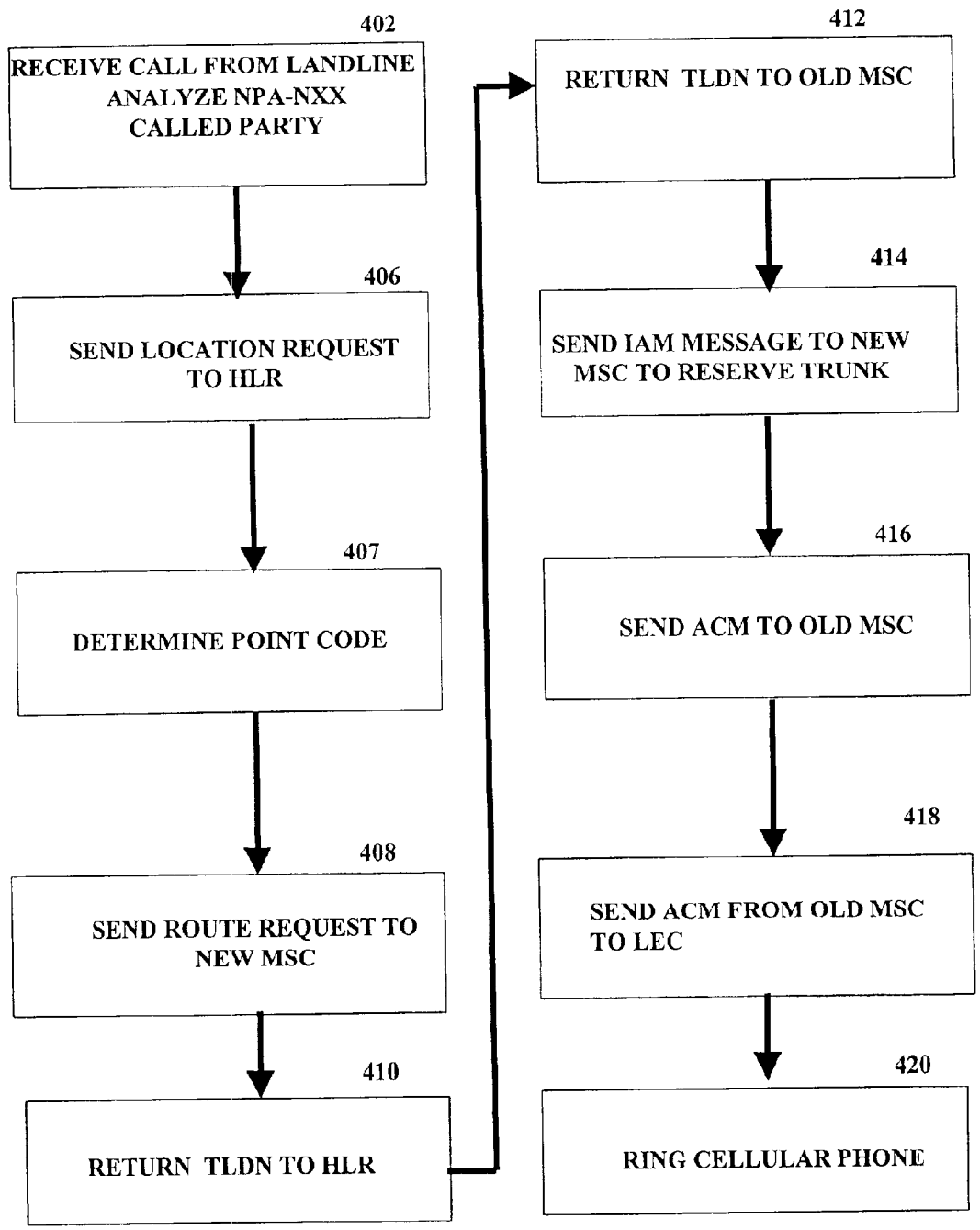
FIG. 4 is a flowchart for a method for calling a cellular telephone registered on a new MSC during cluster testing from a land line telephone according to an embodiment of the present invention.

FIG. 4 is a flowchart for a method for calling a cellular telephone registered on new MSC 104 from a land line telephone during cluster testing according to an embodiment of the present invention. The cellular telephone is registered with a new MSC that is undergoing cluster testing. As described above, as part of this registration process, a registration message is sent to an HLR to provide location information for responding to location requests from other MSCs in the cellular system.

The method begins with step 402 of receiving a request to complete a telephone call to the cellular telephone in the new MSC from the LEC. In step 402, the method continues with the step of analyzing the NPA-NXX of the called party number. In the present case, it is determined that the NPX-NXX belongs to an old MSC. In step 404, the method continues by sending an IAM message to the old MSC to reserve a trunk in a trunk group between the LEC and the old MSC. Old MSC 102 receives the IAM message. The method continues with step 406 of sending a location request to HLR 105. In step 407, the method continues with the step of determining the point code for the MSC servicing the cellular telephone. In this case, the point code is the TPC assigned to the new MSC. In step 408, the method continues with the step of sending a route request to the new MSC. The method continues in step 410 with the step of obtaining a TLDN from a new range of TLDNs created for the new MSC according to an embodiment of the present invention. In step 412, the method continues with the step of returning the obtained new TLDN in response to the route request.

The new TLDN is recognized as belonging to new MSC 104. Thus, in step 414, the method continues with the step of sending an LAM message over a new signaling link between the new MSC and the STPs to reserve a trunk in a new trunk group built between the old MSC and the new MSC. The method continues in step 414 with the step of sending an IAM message to the new MSC to reserve a trunk between the old and the new MSC. In step 416, the method continues with the step of generating an ACM message to indicate a trunk between the old MSC and the new MSC has been reserved and sending the ACM message in response to the IAM message. In step 418, the method continues with the step of sending the ACM message to indicate a trunk between the old MSC and the LEC has been reserved. In step 420, the method continues by completing the call path and ringing the cellular phone.

Figure 5:
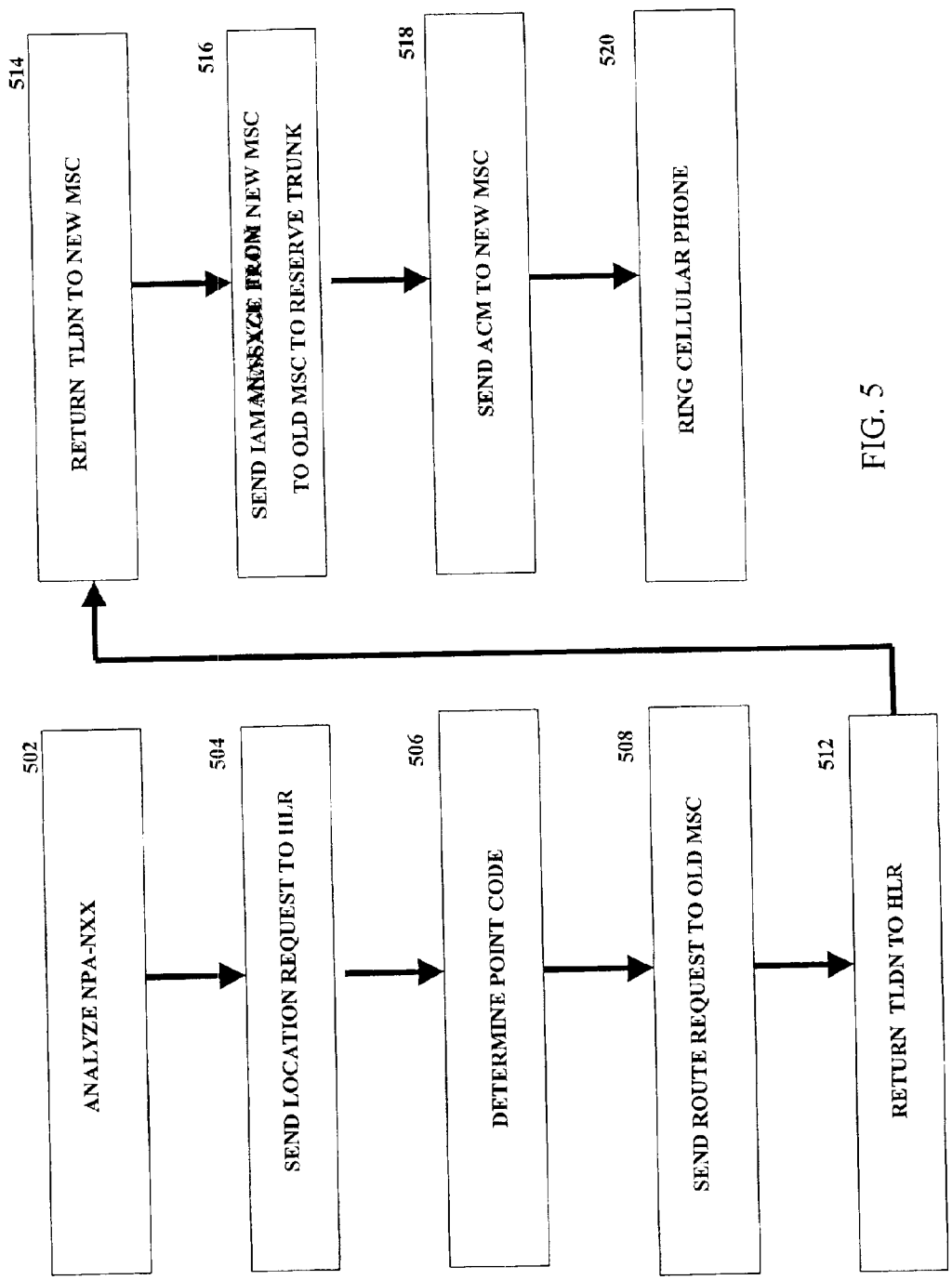
FIG. 5 is a flowchart for a method for calling a cellular telephone registered on an old MSC from a cellular telephone registered in a new MSC during cluster testing according to an embodiment of the present invention.

FIG. 5 is a flowchart for a method for calling a cellular telephone registered on an old MSC from a cellular telephone registered on a new MSC during cluster testing according to an embodiment of the present invention. The cellular telephone is registered with the new MSC. As described above, as part of this registration process, a registration message is sent to an HLR to provide location information for responding to location requests from other MSCs in the cellular system.

The method begins in step 502 with the step of analyzing the NPA-NXX associated with the called party number. The NPA-NXX is determined to be associated with a cellular telephone that is not registered on the new MSC. Based on this analysis, the method continues in step 504 with the step of sending a location request to an HLR to get a location of the called party cellular telephone. The method continues in step 506 with the step of determining the point code of the MSC associated with the called party number. In this case, the point code is associated with the old MSC. The method continues in step 508 with the step of sending a route request to the old MSC 104. The method continues with the steps of receiving the route request and obtaining a TLDN from the old MSC, and with the step of sending the obtained TLDN in response to the route request in step 512. The method continues in step 514 with the step of returning the TLDN in response to the location request. In step 516, the method continues with the step of analyzing the TLDN to determine a trunk on which to complete the call. The analysis causes the method to continue with the step of sending an IAM message to the old MSC over a new signaling link to reserve a trunk in a new trunk group built between the old MSC and the new MSC. Then, in step 518, the method continues with the step of sending an ACM message to indicate that the trunk has been reserved. In step 520, the method continues with the step of paging the cellular telephone to ring it.

Figure 6:
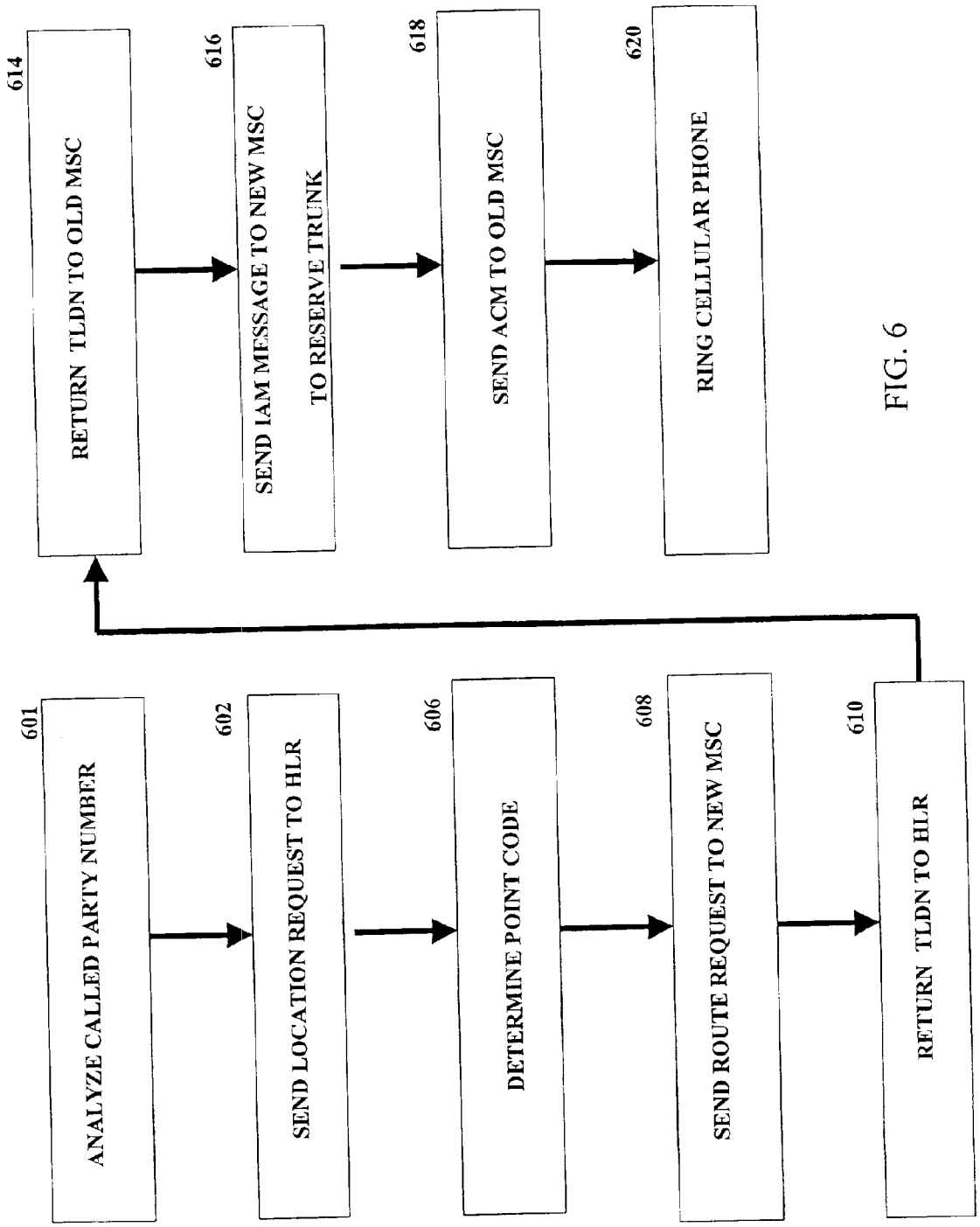
FIG. 6 is a flowchart for a method for calling a cellular telephone registered on a new MSC from a cellular telephone registered on an OLD MSC during cluster testing according to an embodiment of the present invention.

FIG. 6 is a flowchart for a method for calling a cellular telephone registered on a new MSC from a cellular telephone registered on an old MSC during cluster testing of the new MSC according to an embodiment of the present invention. The cellular telephone is registered with the new MSC. As described above, as part of this registration process a registration message is sent to an HLR to provide location information for responding to location requests from other MSCs in the cellular system.

The method begins in step 601 with the step of analyzing the called-party number. This analysis reveals that the NPA-NXX is a cellular telephone. Thus, the method continues in step 602 with the step of sending a location request to the HLR. In step 606, the method continues with the step of analyzing the called party number to determine the point code of the MSC on which the cellular phone corresponding to the called party number is registered. In this case, the point code corresponds to the TPC assigned to the new MSC according to the present invention. . In step 608, the method continues with the step of sending a route request to the MSC corresponding to the TPC, i.e., the new MSC, to request a TLDN on which to route the telephone call. In step 610, the method continues with the process of obtaining a TLDN from a new range of TLDNs assigned to the new MSC. In step 614, the method continues with the step of sending the TLDN to old MSC so that the old MSC can set up a call path to the new MSC. In 616, the method continues with the step of sending an IAM message to the new MSC over a new signaling link established between the new MSC and the STPs to reserve a trunk in a new trunk group built between the old MSC and the new MSC. In step 618, the method continues with the step of sending an ACM message to the old MSC over the new signaling link to indicate that a trunk has been reservedIn step 620, the method continues with the step of paging cellular telephone 112 to ring cellular telephone 112.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A system for providing cellular telephone service during cluster testing, comprising:
   (a) a new mobile switching center having a temporary point code on which a cellular telephone can register;
   (b) an old mobile switching center having a second point code, wherein the temporary point code is different from the second point code;
   (c) a trunk group connected between the new mobile switching center and the old mobile switching center to route one or more telephone calls between the old mobile switching center and the new mobile switching center;
   (d) a communication link connected between the new mobile switching center and one or more signal transfer points to provide a communication path for sending messages between the old mobile switching center and the new mobile switching center; and
   (e) a home location register for storing location information comprising an identification of the cellular telephone and a point code of the new mobile switching center, wherein the home location register receives a registration message comprising location information from the new mobile switching center when the cellular telephone registers.

2. A system recited in claim 1, wherein a switch transfer point of the one or more switch transfer points determines a point code corresponding to the home location register and forwards a location request received from the new mobile switching center to the home location register to determine a location of a second cellular telephone that is called by the first cellular telephone.

3. The system recited in claim 2, further comprising a global translation title table that is used by the switch transfer point to determine the point code corresponding to the home location register.

4. The system recited in claim 1, further comprising a new range of temporary local directory numbers assigned to the new mobile switching center.

5. The system recited in claim 4, further comprising a route request sent by the home location register to the new mobile switching center to obtain a temporary local directory number to send to a mobile switching center in the system other than the new mobile switching center that provides routing information for routing a telephone call to the cellular telephone.

6. The system recited in claim 1, further comprising:
   an initial access message sent over the communication link from the old mobile switching center to the new mobile switching center to request a call to be routed over the trunk group;
   means for paging the cellular telephone; and
   an answer complete message sent over the communication link from the new mobile switching center to the old mobile switching unit when the cellular telephone is answered.

7. A method for maintaining cellular telephone service in a cellular telephone network during cluster testing comprising the steps of:

assigning a temporary point code to a new mobile switching center;

cutting the new mobile switching center into the cellular telephone network;

building a trunk group between the mobile switching center and an old switching center that the new mobile switching center will replace; and building a signaling link between the new mobile switching center and the old mobile switching center, wherein telephone calls are set up on the trunk group to maintain cellular telephone service during cluster testing.

8. The method recited in claim 7, further comprising the step of assigning a new TLDN range to the new mobile switching center.

9. The method recited in claim 7, further comprising the steps of:

receiving an initial address message from the old mobile switching center on the signaling link;

sending an address-complete message in response to the initial address message; and ringing a cellular telephone in accordance with the initial address message.

10. The method recited in claim 7, wherein building the trunk group comprises creating a physical connection between the old mobile switching center and the new mobile switching center.

11. The system of claim 1, wherein the trunk group is connected between the old mobile switching center and the new mobile switching center by a physical connection.

12. A computer readable medium having instructions that when executed by a new mobile switching center that is connected to an old mobile switching center by a trunk group for routing calls and that is connected to a signaling link perform the following acts:

receiving an initial address message from an old mobile switching center over the signaling link;

sending an address-complete message in response to the initial address message to the old mobile switching center over the signaling link;

ringing a cellular telephone in accordance with the initial address message; and upon the cellular telephone answering, completing the call to the cellular telephone over the trunk group connected to the old mobile switching center.

13. The computer readable medium of claim 12, wherein the instructions when executed by the new mobile switching center perform the additional act of sending a registration message comprising location information from the new mobile switching center to a home location register when the cellular telephone registers.

14. The computer readable medium of claim 12, wherein the instructions when executed by the new mobile switching center perform the additional act of receiving a route request sent by a home location register to obtain a temporary local directory number to send to the old mobile switching center that provides routing information for routing the telephone call to the cellular telephone.

* * * * *